Oct. 21, 1958   D. R. DE BOISBLANC ET AL   2,857,324
ENGINEERING TEST REACTOR
Filed May 22, 1956   7 Sheets-Sheet 1
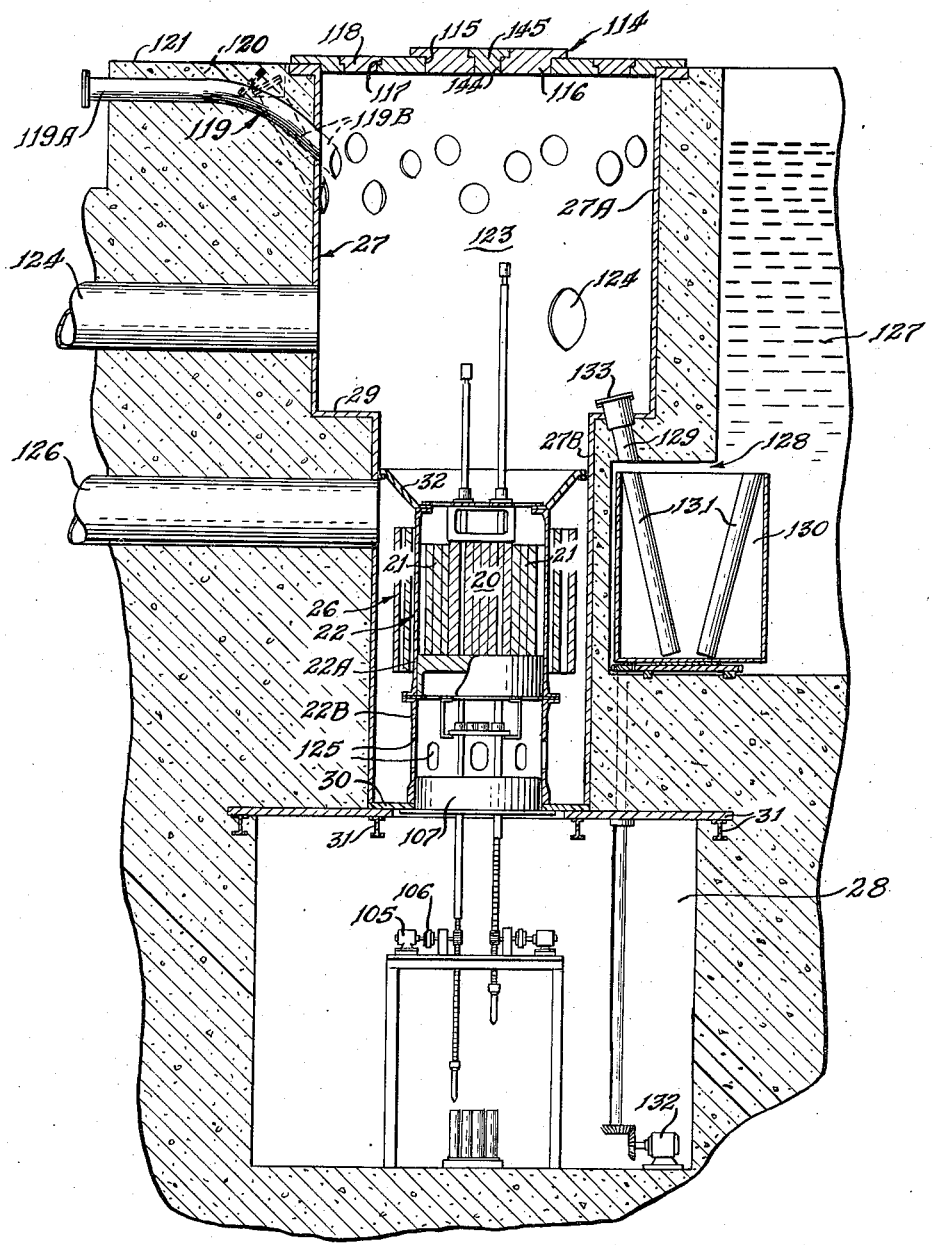

Oct. 21, 1958     D. R. DE BOISBLANC ET AL     2,857,324
ENGINEERING TEST REACTOR
Filed May 22, 1956     7 Sheets-Sheet 2
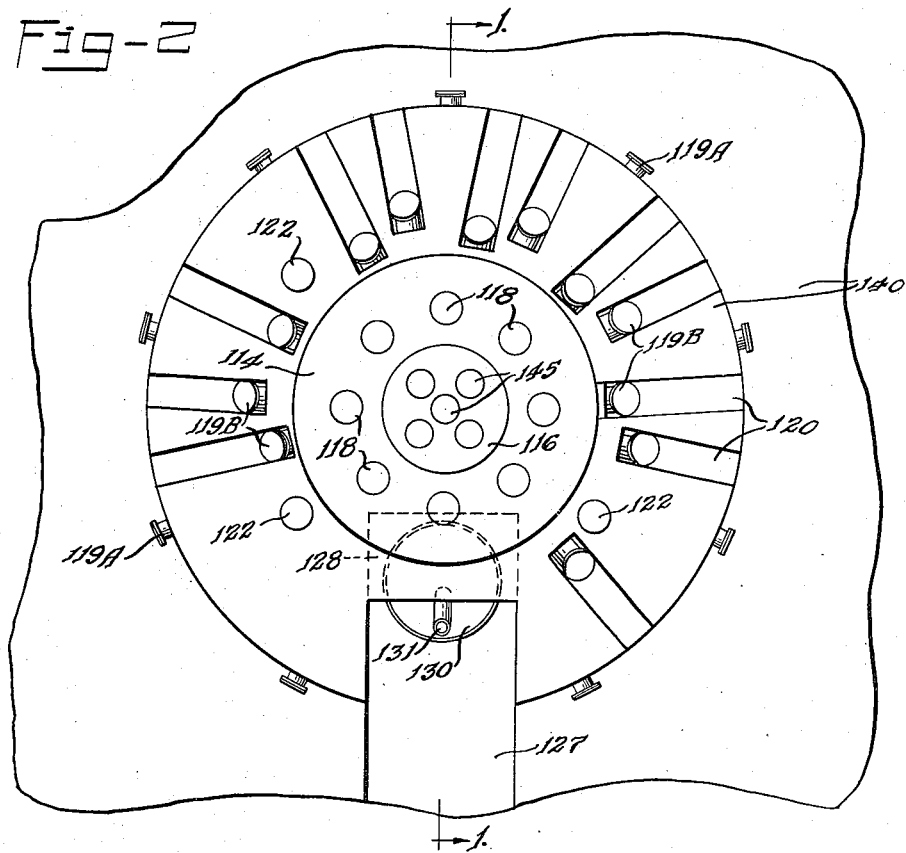
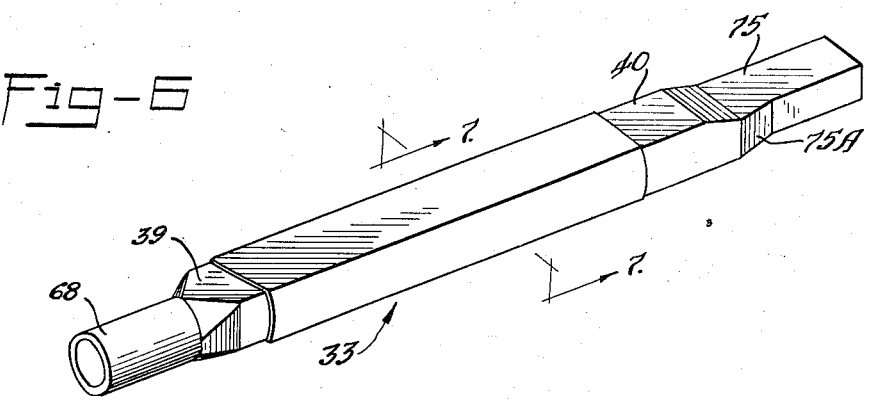

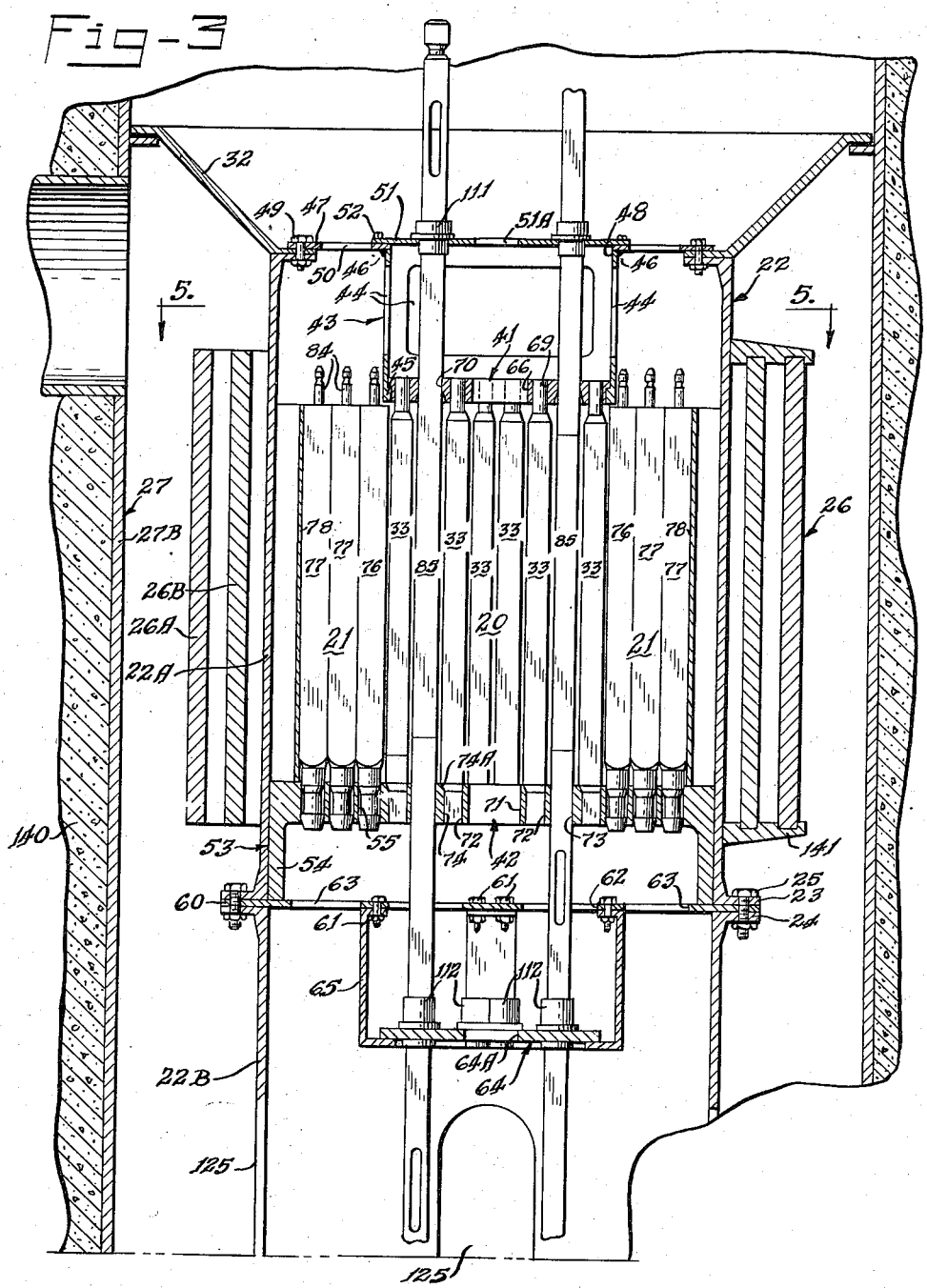

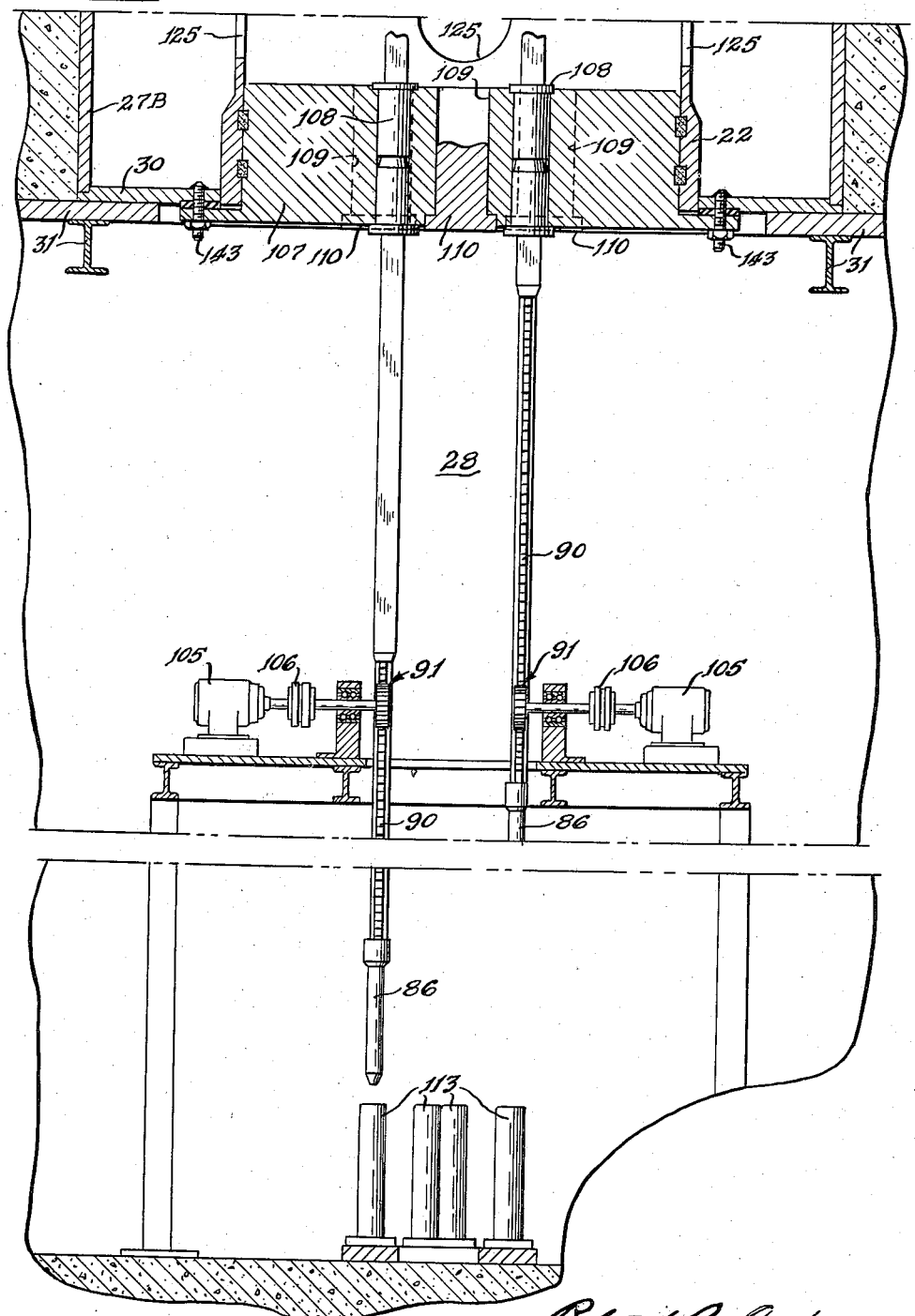

Oct. 21, 1958  D. R. DE BOISBLANC ET AL  2,857,324
ENGINEERING TEST REACTOR

Filed May 22, 1956  7 Sheets-Sheet 6

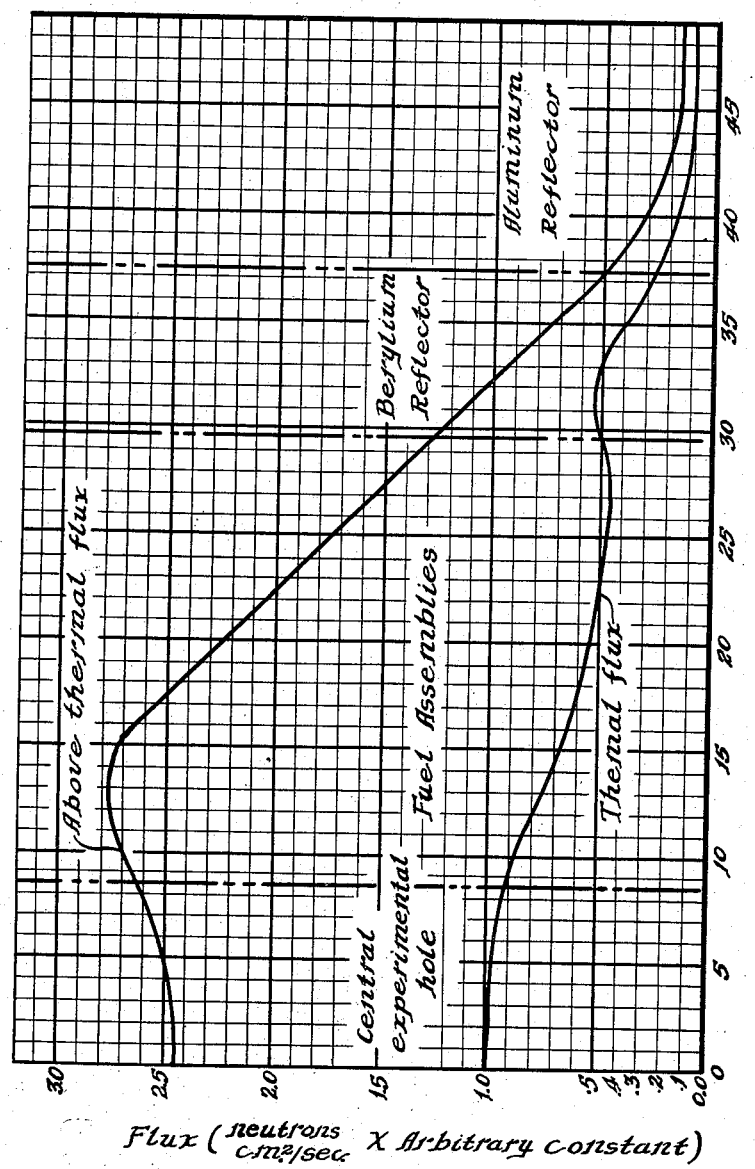

United States Patent Office 2,857,324
Patented Oct. 21, 1958

2,857,324

ENGINEERING TEST REACTOR

Deslonde R. de Boisblanc, Marion E. Thomas, Robert M. Jones, and George H. Hanson, Idaho Falls, Idaho, Julian W. Webster, Palo Alto, Calif., and Carl F. Leyse, Clayton, Mo., assignors to the United States of America as represented by the United States Atomic Energy Commission Application May 22, 1956, Serial No. 586,629

5 Claims. (Cl. 204—193.2)

The present invention relates to nuclear reactors and, in particular, to nuclear reactors which are to be constructed primarily for use in research.

Nuclear chain reactors are constructed for a variety of purposes and the structure of each reactor constructed will depend to a large extent on the use to which the reactor is to be put. Reactors which are constructed primarily for the production of power are known as power reactors and must be provided with means enabling the utilization of the heat arising in the course of the chain reaction as useful power. Reactors built primarily for the production of fissionable material are called production reactors and must be provided with means for the irradiation of fertile materials and recovery of the fissionable materials formed. Reactors built primarily to test new methods of reactor design or to supply neutrons for physical research and radioisotope manufacture are known as research and development reactors. It is to this last category of nuclear reactor that the present invention relates.

A reactor having relatively large volume high fast neutron flux facilities extending entirely through the reactor core for accommodating through type experiments is most useful for research purposes. Previous research reactors such as the Materials Testing Reactor, disclosed and claimed in application Serial No. 314,595, filed October 14, 1952, now Patent No. 2,831,806, issued April 22, 1958, on behalf of Eugene P. Wigner, and located at the National Reactor Test Station at Arco, Idaho, are most suitable for use in experiments involving thermal neutrons, and the materials testing reactor has a very high thermal neutron flux. The present reactor is designed to be complementary to that reactor as having facilities which in addition to providing a high thermal neutron flux make it very suitable for use where a very high fast neutron flux is desired.

The inventors have found that a light-water-moderated, light-water-cooled, beryllium-reflected nuclear chain reactor which is fueled with a multicellular array of elongated fuel assemblies containing material fissionable by neutrons of thermal energy arranged in cruciform shape with a relatively large opening at the center of the cross satisfies these requirements.

A fissionable material will be suitable for use in a particular reactor if the fuel region of the reactor satisfies the equation $\Sigma_f \eta > \Sigma_c$ for the energy range in which the reactor will operate.

$\Sigma_f$ is the macroscopic fission cross section of the fissionable component, or components, averaged over the particular energy range.

$\Sigma_c$ is the macroscopic capture cross section of all components of the fuel region of the reactor.

$\eta$ is a factor obtained by the solution of the equation $$\eta = \frac{\nu \Sigma_f}{\Sigma_{1a} + \Sigma_{2a} + \Sigma_{3a}}$$

where $\Sigma_f$ is the macroscopic fission cross section of the fissionable component of the fuel alloy;

$\Sigma_{1a}$ is the macroscopic absorption cross section of the fuel alloy;

$\Sigma_{2a}$ is the macroscopic absorption cross section of the structural material in the fuel region;

$\Sigma_{3a}$ is the macroscopic absorption cross section of the coolant in the fuel region. (If more than one component contributes to the cross section, the cross section is the average of the individual cross sections. In all cases the cross section is averaged over the energy range in which the reactor operates.)

$\nu$ is the number of fast neutrons released per fission.

While the specific fuel described is uranium enriched to 90% $U^{235}$, other fuel materials may be used. For example, $Pu^{239}$ or $U^{233}$ may be substituted for the $U^{235}$ in the fuel material of the above reactor. It is also contemplated that mixtures of fissionable materials, such as $U^{235}$ and $Pu^{239}$, may be used as the fissionable component of the fuel material of the reactor. The critical masses of other fissionable materials may be determined for particular reactor active portion configurations according to the methods disclosed in such publications as "Current Status of Nuclear Reactor Theory," A. Weinberg, Am. J. of Phys., vol. 20, October 1952, pp. 401–412, and "Multigroup Methods for Neutron Diffusion Problems," R. Ehrlich and H. Hurwitz, Jr., Nucleonics, vol. 12, No. 2, February 1954, pp. 23–30. The pertinent cross sectional data may be obtained from such publications as "Neutron Cross Sections," A. E. C. U.-2040, OTS, Dept. of Commerce.

In addition to the central opening four openings of the same size as the central opening are provided at the corners of the cross. Although the flux is not as high in these openings as it is in the central opening, these openings provide room and a sufficiently high flux to satisfy many research requirements. The large central opening is, however, most useful for research purposes and the primary inventive concept contained herein resides in a reactor core geometery which will support a chain reaction even though no fissionable material is present in the center thereof. If not in use for research purposes any of these openings may be provided with a removable grid and the opening may be filled with fuel elements or reflector elements.

One of the requirements of a research reactor is that installation of experiments and post irradiation handling of materials should be as simple and straight-forward as possible. This is accomplished by driving the control elements from the bottom of the reactor to minimize interference above the reactor. All experiments are then inserted and removed from the top of the reactor.

The reactor is cooled by light water which flows down through the core of the reactor thereby cooling the fuel elements contained therein, is exhausted radially outwardly below the core, and then flows up past the outside of the reactor core to discharge. Before the water is discharged it also cools a thermal shield which surrounds the tank. This water is flowing through the reactor core serves also as the moderator which slows the neutrons down to thermal energies.

As the drive means for the control elements are located below rather than above the reactor core, it is a very simple matter to remove and replace the fuel elements forming the active lattice of the reactor core. This may be done from above by employing a crane to lift a fuel element out of the core and, without removing it from the water, to drop it through a discharge chute into a storage canal filled with water. For ease of handling within the canal the fuel assembly is dropped from the discharge chute directly into a receptacle on a rotating transfer member within the canal. The rotating transfer member is then rotated to locate the fuel element in a position where the same crane used previously, or another crane, can be employed to remove the fuel element from the receptacle and shift it to another location in the canal without removing it from the water.

A primary object of the present invention is to construct a reactor having relatively large volume high fast neutron flux facilities extending entirely through the reactor core.

A further object of the present invention is to construct a reactor including a core comprising a plurality of fuel elements arranged in cruciform shape with a relatively large opening at the center of the cross.

Another object of the present invention is to construct a reactor cooled by a flow of light water which prior to its discharge from the reactor also serves to cool a thermal shield disposed about the reactor core.

A final object of the invention is to construct a reactor including a novel discharge means for the fuel assemblies in which the discharge is direct from reactor vessel to canal, and the handling of the fuel assemblies is extremely simple.

Fig. 1 is a vertical sectional view of a nuclear reactor constructed according to the teachings of the present invention;

Fig. 2 is a top plan view thereof;

Fig. 3 is a vertical sectional view of a portion of the reactor tank;

Fig. 4 is a vertical sectional view of the remaining portion of the reactor tank;

Fig. 6 is an isometric view of one of the fuel assemblies of the nuclear reactor;

Fig. 12 is a graph showing radial flux distribution within the reactor.

Figure 5:
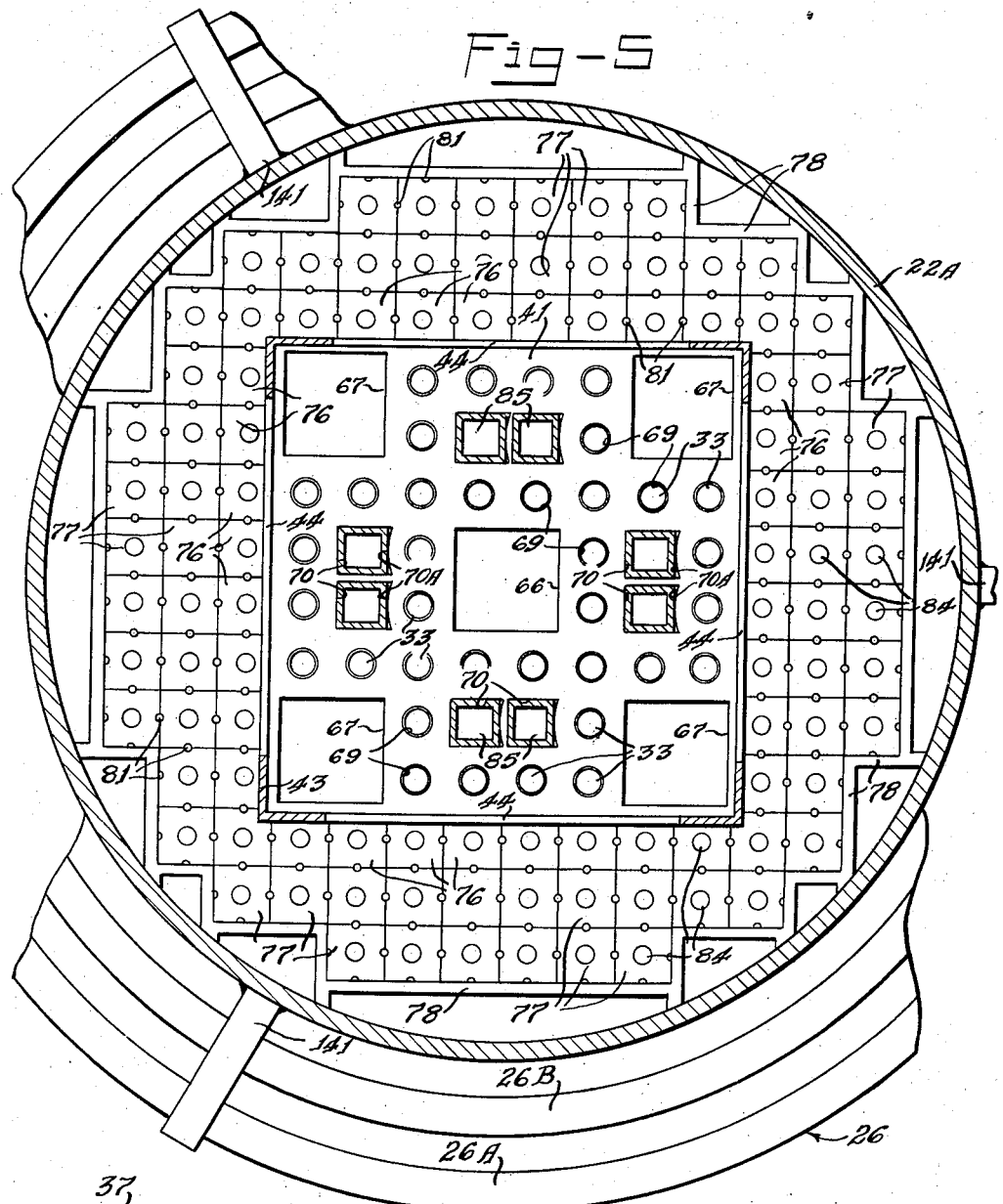
Fig. 5 is a partial sectional view taken along the lines 5—5 in Fig. 3 and looking in the direction of the arrows.

As shown in Fig. 1 and Fig. 3, the reactor of the present invention comprises essentially a core or active portion 20 and a reflector 21 surrounding the core. The core 20 and reflector 21 are contained within an inner vessel 22 which is separated into an upper section 22A and a lower section 22B, joined at flanges 23 and 24 by bolts 25. Surrounding the core 20 and reflector 21 is a thermal shield 26 supported by brackets 141, and enclosing the entire reactor is a main pressure vessel 27. A massive biological shield 140 of concrete surrounds the reactor and beneath the reactor there is a subpile room 28.

As shown, the upper portion 27A of the outer pressure vessel 27 is much larger than the lower portion 27B forming a ledge 29. Inner vessel 22 and outer vessel 27 are connected in watertight relationship by bottom member 30, and both vessels are supported by beams 31 which are in turn supported by the walls of the subpile room 28. A frusto-conical deflecting member 32 is attached to the top of the inner vessel 22 and extends between the inner vessel 22 and the main pressure vessel 27 to deflect coolant into the inner vessel 22. Since the deflecting member 32 is not attached to the main pressure vessel 27, the top of the inner vessel 22 is floating with respect to the main pressure vessel and problems arising from thermal expansion of the vessels are thereby obviated.

It should be noted that this arrangement of vessels is notable for the absence of inaccessible gasketed joints. It will be noted that there is no requirement for watertight joints on the inner vessel and the main vessel will require mechanical closures at the top and bottom closures only.

In one particular construction of the nuclear reactor which will be used to illustrate the present invention throughout the specification, the main pressure vessel 27 is 23′ 9″ in depth of which the upper portion 27A is 11 ft. deep and the lower portion 27B is 12′ 9″. The upper portion 27A is 10′ 8″ in diameter and the lower portion 27B is 6′ 10″ in diameter. The inner vessel 22 is 11 ft. in depth and 4 ft. in diameter. The reactor vessels are constructed of A. I. S. I. types 304 or 304 E. L. C. stainless steel.

The thermal shield 26 consists of two concentric cylinders 26A and 26B formed of 4 inch thick carbon steel clad with a stabilized carbon steel.

Figure 8:
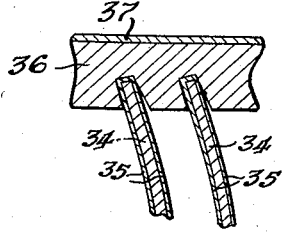
Fig. 8 is an enlarged fragmentary sectional view of the fuel assembly.
Figure 7:
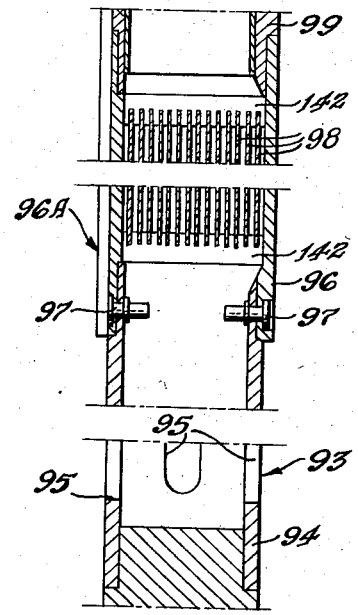
Fig. 7 is a transverse sectional view of the fuel assembly taken along line 7—7 of Fig. 6.

The core 20 of the reactor comprises a plurality of fuel assemblies 33 immersed in a water moderator. The fuel assemblies 33 are illustrated in detail in Figs. 6–8. Plates 34 of material fissionable by neutrons of thermal energy are provided with a corrosion resistant cladding 35 and secured to side plates 36. The plates 34 of fissionable material are curved in shape and enclosed within a shrouding 37. A comb-shaped support 38 maintains the plates 34 in rigid spaced relationship. The assembly is provided with end boxes 39 and 40. The end boxes 39 and 40 are attached to the ends of the shrouding 37 and to the ends of the side plates 36.

In the specific embodiment described, the plates 34 are constructed of uranium containing 90 atomic percent $U^{235}$ alloyed with aluminum, the alloy containing 12% uranium by weight. All other portions of the fuel assembly are formed of aluminum. Each fuel assembly 33 contains eighteen plates 34, each plate being 3 inches wide before curving and 36 inches long. Each of the plates 34 is 0.06 inch thick including the cladding 35 and spaced from adjacent plates by 0.118 inch. The inner layer of uranium alloy in all of plates 34 is 2.7 inches wide, before curving, 35 inches long and 0.021 inch thick. Each of the plates 34 contains 10.5 grams $U^{235}$; an entire fuel assembly 33 therefore contains 190 grams $U^{235}$.

The fuel assemblies 33 are supported between an upper assembly grid 41 and a lower assembly grid 42. The upper assembly grid 41 is disposed within upper grid support box 43 and is supported thereby. Box 43 is open at top and bottom and in addition has openings 44 in the four sides thereof. At the bottom of the box 43 a flange 45 extends inwardly from the sides of the box and it is upon this flange 45 that the upper assembly grid 41 rests. Box 43 is welded at 46 to an upper support disk 47 having a square opening 48 at its center of the same size as the box 43. Disk 47 is bolted to inner vessel 22 by bolts 49. Box 43 and upper assembly grid 41 are thereby supported by inner vessel 22. Disk 47 has a plurality of apertures 50 extending therethrough symmetrically located about the central opening 48.

An upper guide grid 51 having a central square opening 51A and corner openings of the same size (not shown) is located above the upper guide grid and spaced therefrom. Upper guide grid 51 is attached to support disk 47 by bolts 52.

The lower assembly grid 42 forms part of a support casting 53 which includes a cylindrical support member 54. Cylindrical support member 54 rests on a lower support disk 60. Disk 60 contains a square opening 62 in the center thereof which is of the same size as the assembly grids 41 and 42. A plurality of apertures 63 in the disk 60 are symmetrically located about the square opening 62.

Bolts 25 in addition to holding together upper and lower inner vessels 22A and 22B also pass through disk 60 thereby holding it in place.

A lower guide grid 64 is positioned beneath the lower assembly grid 42 and has a central square opening 64A and corner openings of the same size (not shown). Lower guide grid 64 is supported by straps 65 attached to disk 60 by bolts 61.

The upper and lower assembly grids 41 and 42 are so constructed that they will support a cross-shaped array of fuel assemblies 33 forming the core 20 of the reactor. The core 20 of the reactor contains sixty-four positions arranged as a rectangular 8 x 8 grid in which the four positions at each of the four corners and the four positions at the center are vacant. Therefore the active portion of the core forms a cross with an opening at the center thereof and there are five openings extending entirely through the core each of which covers about one-sixteenth of the total area covered by the core. Accordingly the upper assembly grid 41 is square in shape and has a central square opening 66 and four square openings 67 (shown in Fig. 5) at the corners thereof. The corner openings 67 are the same size as the central opening 66. Each of these openings 66 and 67 is 6 inches square.

The end boxes 39 of the fuel assemblies 33 are provided with circular connectors 68 which are adapted to fit into circular apertures 69 in the upper assembly grid 41. There are 36 circular apertures 69 to accommodate 36 fuel assemblies. Centrally located in each arm of the cross so as to be completely surrounded by circular apertures 69 are two apertures 70 which are generally rectangular in shape but have one curved side 70A.

The lower assembly grid 42 in addition to a central opening 71 has four square corner openings (not shown) and has rectangular apertures 72 at a location corresponding to that of each circular aperture 69 in the upper assembly grid 41. Also each essentially rectangular aperture 70 in the upper assembly grid 41 is matched with a similarly shaped aperture 73 in the lower assembly grid 42.

One side 74 of rectangular apertures 72 tapers outwardly at 74A near the top of the lower assembly grid 42. End boxes 40 of the fuel assemblies 33 are provided with rectangular connectors 75. A tapered area 75A on one face of the boxes 40 cooperates with the tapered portion 74A of side 74 of apertures 72 to provide a means of orienting and positively seating the fuel assemblies 33 within the apertures 72 in the lower assembly grid 42.

The reflector 21 comprises a single row of 3-inch square beryllium elements 76 enclosing the core 20 in a hollow square of beryllium and a plurality of 3-inch square aluminum elements 77 employed to fill the remaining space between the reactor core 20 and the inner vessel 22. There are thirty-six beryllium reflector elements 76 and sixty-four aluminum reflector elements 77 each of which is 38¼" in length. These reflector elements 77 are held in position by an enclosure 78. Some of the locations in which aluminum elements 77 appear may be filled with beryllium elements 76, if available, since beryllium is a better reflector than is aluminum. However, satisfactory results are obtained with the arrangement described.

Figure 11:
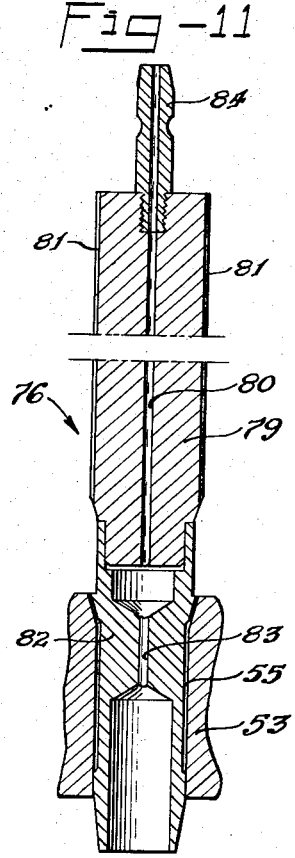
Fig. 11 is a vertical sectional view of a typical beryllium reflector element.

A typical reflector element 76 is shown in Fig. 11. The reflector element 76 comprises a body 79 of beryllium having an axial ¾₆" channel 80 therethrough. A semicircular ⅛" groove 81 is located in each face of the reflector element 76. The body 79 joins an end box 82 which likewise has an axial opening 83 therethrough. End box 82 fits tightly in opening 55 in the support casting 53. Lifting pin 84 is employed to move the reflector element 76. Aluminum reflector elements 77 are of substantially the same construction.

Figure 9:
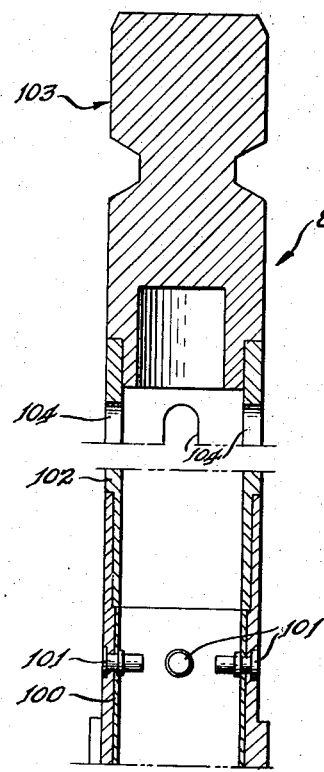
Fig. 9 is a vertical sectional view of a portion of the control element.
Figure 10:
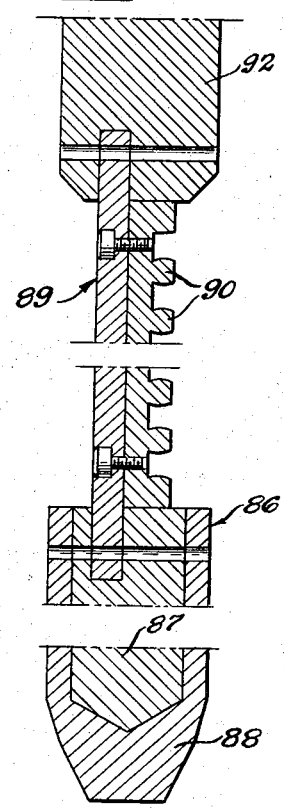
Fig. 10 is a vertical sectional view of the remaining portion of the control element shown in Fig. 9.

Apertures 70 in the upper assembly grid 41 and apertures 73 in the lower assembly grid 42 are provided for control elements 85 to pass through. The control elements 85 are illustrated in Figs. 9 and 10. Each control element 85 is provided with a tip 86 which is constructed of materials which will absorb the shock caused by rapidly inserting the control element into the reactor. A plug 87 of a relatively light material, such as aluminum, sheathed in a jacket 88 of durable material, such as iron, provides a tip 86 which will withstand considerable shock. Located above the tip is an operating section 89 containing rack 90 of a rack and pinion gear 91 (shown completely in Fig. 4). Above a solid connecting section 92 is located a hollow section 93 surrounded by sleeve 94. Sleeve 94 is provided with water outlet apertures 95 and is attached to a tube 96 comprising a fuel section 96A, by pins 97. Tube 96 contains fuel plates 98 identical in construction and design to the fuel plates 34 contained in fuel assemblies 33. Plates 98 are held in place by support members 142. A second sleeve 99 is attached to the opposite end of the tube 96. Fuel plates 98 are curved similarly to the fuel plates 34. Tube 96 and a portion of sleeve 99 are shaped to hold these curved fuel plates 98 and therefore are generally rectangular in cross section but have a curved side. A neutron absorbing liner 100 is disposed within sleeve 99 and is connected thereto by pins 101. The liner 100 should be constructed of a material having a neutron capture cross section of at least 100 barns such as cadmium. Connecting section 102 connects sleeve 99 with head 103 of the control element 85 and contains water inlet apertures 104. Water, therefore, may enter into the connecting section 102 through inlet apertures 104, flow through sleeve 99 and tube 96 between the fuel plates 98, through the sleeve 94, and out of the outlet aperture 95, thus cooling the control element 85.

The control elements 85 are operated by motors 105 through the rack and pinion gears 91. A fail-safe magnetic clutch 106 is provided for each control element 85 so that in an emergency all of the control elements 85 under the influence of gravity drop into a position where the neutron absorbing liner 100 is within the core 20 of the reactor, thereby shutting down the reactor. Either fuel section 96 or the section containing neutron absorbing liner 100 of the control element 85 may be disposed within the core 20.

The control elements 85 pass through bottom plug seals 108 in a bottom plug 107 which serves as a closure for the lower end of the inner vessel 22. Bolts 143 hold plug 107 in place. The bottom-plug seal 108 is designed to prevent water leakage where the control elements 85 pass through the bottom plug 107. Openings 109 are provided in the bottom plug 107 in line with the central opening 71 and the corner openings in the lower assembly grid. When not needed these openings may be closed with plugs 110.

The control elements 85 are journaled within bearings 111 and 112 in upper and lower guide grids 51 and 64, respectively. Shock absorbers 113, aligned with the bearings 111 and 112, are provided for the purpose of absorbing a portion of the shock caused by the falling control elements 85 when the control elements are rapidly inserted in the reactor.

As before stated there are a total of thirty-six fuel assemblies 33 each containing eighteen fuel plates 34 in the core 20 of the reactor. In addition there are eight control elements 85 each containing a fuel section 96A, each of which contain fourteen fuel plates 98. Accordingly the core of the reactor may contain up to a total of 760 fuel plates. As fuel plates 34 and 98 are identical the fuel loading of the core 20 of the reactor is eight kilograms of $U^{235}$. This includes sufficient fuel over the critical mass to allow for fission product poisons and for fuel burn-up.

When a control element 85 is lowered the neutron absorbing liner 100 is at least partially disposed within the core 20 of the reactor, thereby at least partially removing some of the fuel plates 34 and reducing the reactivity of the core 20 of the reactor.

The top of the main pressure vessel 27 is provided with a cover 114. Cover 114 contains a central opening 115 provided with a central closure 116, and with a number of smaller experimental access openings 117 each provided with a closure 118. Five openings 144 each provided with a plug 145 are located in central closure 116 as shown in Fig. 1.

Openings 109 in the lower plug 107, openings 144 in the central closure 116, and the relatively large square opening at the center and the four corners of upper and lower assembly grids 41 and 42, the upper guide grid 51 and the lower guide grid 64, are all aligned so that relatively large openings extend entirely through the core at the center and at the four corners thereof. To carry out through type experiments a pipe or loop would be passed through the entire reactor structure including the upper cover and lower plug. Such a pipe would be sealably fitted into plugs 110 and 145. Experiments in which it is desired that the sample be retained in the reactor core for only a very short period of time can be carried out in such a loop.

In addition to the experimental access openings 117, a number of reactor vessel access holes 119 in the biological shield 140 are provided. Certain of these holes 119A extend radially outward from the main reactor vessel entirely through the biological shield 140. Others 119B of these holes extend diagonally upward to open into trenches 120 in the top surface 121 of the biological shield 140.

There are also three access openings 122 which extend all the way from the top surface 121 of the reactor structure through the concrete shield 140 to the subpile room 28.

The reactor is both cooled and moderated by the same flow of water. The main pressure vessel 27 is provided with a reservoir portion 123 within the enlarged upper portion 27A of the main pressure vessel 27. Inlet lines 124 are connected to the reservoir portion 123 of the vessel 27 and introduce the water coolant thereinto. The water coolant flows downward and is deflected by member 32 into the inner vessel 22 where it flows through the fuel assemblies 33 and the control elements 85 of the reactor core 20, and also through channels 80 and 81 in the reflector 21. After flowing through the reactor core 20 the coolant is exhausted radially from the inner vessel 22 through openings 125 in the inner vessel 22, then rises vertically through the lower portion 27B of the main reactor vessel 22, and is finally exhausted from the main reactor vessel 27 through outlet lines 126. The flow of the coolant liquid past the control elements 85 assists the action of gravity when the control elements 85 drop to shut down the reactor in the event of an emergency.

It will be noted that the coolant in addition to cooling the core 20 of the reactor flows past the thermal shield 26 just before it is exhausted from the vessel 27 and thereby cools the thermal shield 26. The water flowing upwardly toward the exhaust line has, in addition to its cooling effect on the thermal shield 26, a thermal shielding effect of itself. In addition the arrangement described ensures that the reactor core 20 is always under water even though the outlet lines 126 be severed since the process water circuit takes the form of a U-tube.

To load the reactor, top cover 114 is removed, upper guide grid 51 and upper assembly grid 41 are both removed, and the rectangular connectors 75 of fuel assemblies 33 are inserted into the rectangular apertures 72 of the lower assembly grid 42. The upper assembly grid 41 is then replaced in the upper grid support box 43, the circular connectors 68 of the fuel assemblies 33 being disposed within the circular apertures 69 of upper assembly grid 41. A number of control elements 85 are disposed with neutron absorbing liners 100 within the core 20 of the reactor in order to prevent the core from becoming critical. With the control elements 85 and the fuel assemblies 33 positioned in the core 20, the upper guide grid 51 is replaced, and the cover 114 replaced on the pressure vessel 27. The water coolant may then be circulated through the reactor, forming a pool of water in the reservoir portion 123 of the main pressure vessel 27. This pool extends above the core 20 of the reactor to the cover 114 and forms a shield for the upper portion of the reactor. In the specific embodiment of the invention described this pool of water is about 15 feet deep.

A canal 127 exterior to the reactor structure proper has a secondary portion 128 extending beneath the enlarged portion 27A of the main pressure vessel 27. This canal 127 is about twenty feet deep and contains water. A discharge chute 129 connects the main pressure vessel 27 with the canal 127. Located within the secondary portion 128 of the canal 127 and so disposed that a part thereof extends out into the main part of the canal is a rotatable transfer member 130 having receptacles 131 therein large enough to hold a fuel assembly 33 which receptacles are so located that they may in turn be aligned with discharge chute 129.

The reactor is unloaded by raising a fuel assembly 33 clear of the active lattice, moving it sidewise and dropping it through discharge chute 129 into one of the receptacles 131 located in transfer member 130. The specific procedure for removing the fuel elements 33 from the active lattice is the reverse of the charging procedure described above. After a fuel assembly 33 is dropped through discharge chute 129 into one of the receptacles 131 the transfer member 130 is rotated by motor 132 to locate this receptacle in the main portion of the canal. While this fuel assembly 33 is being removed from the receptacle 131 for storage elsewhere in canal 127, another fuel assembly 33 may be placed in the other receptacle 131. Note that the same crane can be used to remove the fuel assembly from the receptacle 131 as was used to remove it from the core 20 of the reactor.

Since the water level in the reactor vessel and in the canal is essentially the same, no valves are necessary on the discharge chute 129. A simple plug 133 may be employed to prevent leakage through discharge chute 129. This plug may be removed during periods of reactor shutdown when unloading is carried out. It will be noted that this construction of the discharge means provides a simple yet positive means for discharge wherein the fuel elements are readily handled from a location above the reactor. No complex interlocking of valves is required and the discharge is direct from vessel to canal so that the fuel elements do not contaminate any other area.

The total flow rate of cooling water through the reactor is about 40,000 gal. per minute. The operating pressure above the reactor core is 125 p. s. i. g. The pressure drop is about 35 p. s. i. g. in passage through the reactor. The inlet cooling water temperature is about 130° F. At an operating power level of 75 megawatts, the outlet temperature of the water is 143° F. when the total flow rate of 40,000 G. P. M. of water is used. The entire process water system, with the exception of pump casings, which may be made of cast iron, is constructed of type 347 stainless steels. The cooling water is demineralized by passing a side stream thereof through a mixed resin bed. The heat contained by the cooling water is dissipated by direct heat exchange with another cooling water system which is in turn cooled by passage over forced draft cooling towers.

At a power of 75 megawatts, the average thermal flux, with the initial charge of fuel in the reactor is about $2 \times 10^{14}$; at the end of the cycle when the fuel content is reduced about ¼, the average thermal flux is $3 \times 10^{14}$. The average above thermal flux is always $1 \times 10^{15}$.

Fig. 12 shows graphically the relative radial flux distribution within the reactor. The thermal flux values in the figure can be converted to neutrons/cm.$^2$ second at 75 megawatts by multiplying by $5.0 \times 10^{14}$ for the beginning of the run and by $6.7 \times 10^{14}$ for the end of the run. The above thermal flux values remain roughly constant during the run and the conversion factor here is $6.7 \times 10^{14}$. The flux values obtained in this way are midplane values.

It is thus seen that the thermal flux in the central experimental hole is about $5.0 \times 10^{14}$ neutrons/cm.$^2$ second at the beginning of the run and $6.7 \times 10^{14}$ neutrons/cm.² second at the end of the run. The above thermal flux in the central experimental hole is about $1.7 \times 10^{15}$ neutrons/cm.² second. In the corner holes the thermal flux is about $2.3 \times 10^{14}$ neutrons/cm.² second at the beginning of the run and $3 \times 10^{14}$ neutrons/cm.² second at the end of the run while the above thermal flux is $9 \times 10^{14}$.

Thus we have very high above thermal fluxes in the central and corner holes and very high thermal flux in the central hole and very good thermal flux in the corner holes. The choice experimental facility is obviously the 6 x 6 central hole.

As an aid in understanding the present invention, reference is made to the following publications: Experimental Production of Divergent Chain Reaction, E. Fermi, American Journal of Physics, vol. 20, No. 9, December 1952; Science and Engineering of Nuclear Power, C. Goodman, Addison-Wesley Press, Inc., Cambridge, Mass., vol. 1 (1947) and Vol. 2 (1949); The Elements of Nuclear Reactor Theory, S. Glasstone and M. Edlund, D. Van Nostrand Co., Inc., New York, 1952; Elementary Pile Theory, H. Soodak and E. C. Campbell, John Wiley and Sons, New York, 1950; and to U. S. Patent No. 2,708,656, issued on May 17, 1955, to E. Fermi and L. Szilard.

From the foregoing description, it will be readily apparent to the man skilled in the art that the reactor disclosed satisfies the objects of this invention.

It is not desired that the scope of the present invention be limited by the foregoing description but only by the appended claims.

What is claimed is:

1. A nuclear reactor comprising, in combination, a main pressure vessel, an inner vessel located within the main pressure vessel, said main pressure vessel and said inner vessel being in communication near the bottom thereof, a core containing material fissionable by neutrons of thermal energy and a reflector disposed about the core located within the inner vessel, a thermal shield disposed within the main pressure vessel about the core of the reactor, means to introduce coolant fluid into the top of the inner vessel, and means to discharge coolant fluid from the main pressure vessel at a location above the location of the thermal shield, whereby coolant fluid will flow through the reactor core, from the inner vessel into the main pressure vessel, and past the thermal shield to discharge.

2. A nuclear reactor comprising, in combination, a main pressure vessel, an inner vessel located within the bottom half of said main pressure vessel, said main pressure vessel and said inner vessel being in communication near the bottom thereof, a core containing enriched uranium and a reflector disposed about the core located within the inner vessel, a thermal shield disposed within the main pressure vessel about the core of the reactor, means to introduce water into the top of the main pressure vessel, a deflecting member extending between the top of the inner vessel and the main pressure vessel for deflecting water into the inner vessel, means to discharge the water from the main pressure vessel just below the deflecting member, whereby coolant fluid will flow through the reactor core, from the inner vessel into the main pressure vessel, and past the thermal shield to discharge.

3. A nuclear reactor according to claim 2 in which the deflecting member is frusto-conical in shape and is attached to the top of the inner vessel but is floating with respect to the main pressure vessel.

4. A nuclear reactor comprising, in combination, a core consisting of a multicellular array of fuel assemblies containing materiail fissionable by neutrons of thermal energy arranged in the form of a cross wherein a relatively large opening at the center of the core extending entirely through the core serves as a high volume, high fast flux test facility, and a reflector disposed about the core, said reflector including a single row of reflector elements formed of beryllium arranged about the core in the form of a hollow square thereby leaving relatively large openings at the corners of the cross which openings extend entirely through the core, each of said openings covering at least one-sixteenth of the total area covered by the core, said reflector also including a plurality of aluminum elements disposed about the beryllium reflector.

5. A nuclear reactor comprising, in combination, a core containing sixty-four positions arranged as a rectangular 8 x 8 grid in which four positions at the center and at each of the four corners of the grid are vacant and in which the remaining forty-four locations in the grid are filled with elements containing material fissionable by neutrons of thermal energy forming thereby a cross-shaped array of elements containing material fissionable by neutrons of thermal energy, eight of said elements being control elements which are symmetrically located about the center of the core and are centrally located within the arms of the cross, the remaining elements being fuel assemblies, and a reflector disposed about the core, said reflector including thirty-six square reflector elements formed of beryllium arranged about the core in the form of a hollow square and a plurality of aluminum elements disposed about the beryllium reflector elements.

References Cited in the file of this patent

UNITED STATES PATENTS 2,708,656    Fermi et al. _____ May 17, 1955
2,806,819    Christy et al. _____ Sept. 17, 1957

OTHER REFERENCES

The Reactor Handbook, vol. 2, AEC Publication, 1955, pp. 855–859.

Proceedings of the International Conference on the Peaceful Uses of Atomic Energy, United Nations, vol. 2 (1956), pp. 403, 407, 457, 469.